Jan. 28, 1941.    R. T. HOSKING    2,229,892
SELF-LOCKING SCREW
Filed March 20, 1939

RICHARD T. HOSKING INVENTOR,
BY *George B Willcox*
ATTORNEY.

Patented Jan. 28, 1941

2,229,892

UNITED STATES PATENT OFFICE 2,229,892

SELF-LOCKING SCREW

Richard T. Hosking, Wilmette, Ill., assignor, by mesne assignments, to Illinois Tool Works, Chicago, Ill., a corporation of Illinois Application March 20, 1939, Serial No. 262,887

6 Claims. (Cl. 151—33)

This invention relates to self-locking devices for rotatable threaded members such as countersunk or conical headed machine screws and the like. In my U. S. Patent No. 2,217,951 of October 15, 1940, filed July 29, 1938, there is described and claimed a locking device of the kind to which my present invention is adapted to be applied.

That device comprises one or more cutting lip elements that project downwardly, that is, in the direction of the length of the screw, from the conical wall of the screw head. Each lip extends peripherally only part way around the head, and a pocket-like channel is provided in the head directly behind the lip and peripherally coextensive with it, the cutting lip being spaced from the head by the channel.

When turned in the tightening direction the screw carries the lip around and downward in a helical path, causing its cutting edge to penetrate progressively deeper into the tapered wall of the hole in the work piece. A slit or cleft, circular in plan view, is thereby produced, and the furrowing action of the lip deflects the cleft strip inwardly and so creates an A-shaped circular wale that stands upright within the tapered hole.

The wale is small at the beginning of the cut, but with the continued helical movement of the lip the A-shaped wale increases in size and height until it substantially fills the pocket-like channel behind the lip, and locks as follows:

When the screw has been completely seated the surface of the smooth conical portion of the head will have pushed or ironed the whole length of the wale back into the space from which it was cleft, excepting the relatively small portion of the wale which is behind the cutting lip. That portion presents a locking element which envelops the back wall of the lip and abuts the ends of it so as to prevent the screw from loosening under vibrational action or other conditions of use.

The foregoing description relates to the device disclosed and claimed in the copending application.

An object of the present improvement is to provide means to create such a locking element without employing the entire conical area of the screw head to push back substantially the entire length of the wale at one time, and thereby to reduce the amount of turning effort required to seat the screw and produce the lock.

Referring now to the present improvement and to the accompanying drawing—

Fig. 2 is an enlarged fragmentary view showing the wale forming and locking device partly in section;

I have modified the smooth conical shape of the head taper described above by providing a groove I that extends peripherally around the head and communicates with the pocket-like channel 2 behind the lip. The purpose of the groove I is to allow the head to be brought fairly to its seat in the tapered hole of a work piece without necessarily ironing out the entire length of the A-shaped wale in the hole completely flat.

Obviously, a long wale cleft from the wall of the tapered hole, can be pushed back all at one time by means of the conical wall of the screw head, into the place from which it was cut provided enough turning effort is exerted. However, I now provide groove I to enable the screw to be fully seated without requiring the user to exert any great amount of ironing-out force or turning effort, and without ironing out the entire length of the wale flush with the wall of the tapered hole in the work piece. Preferably, the depth of groove I is less than the inward projection of the wale as formed in the work piece when the threaded member is nearly seated.

I provide a deflecting element or ridge member 3 located adjacent the trailing edge 4 of the lip and projecting outwardly from the bottom of the groove I, so as to deflect and throw back into the cleft that portion of the wale which emerges from the channel 2 in the wake of the lip. The part of the wale so deflected envelopes the trailing edge 4 of the lip and so causes the wale to fasten the lip to the work piece.

Figure 7:
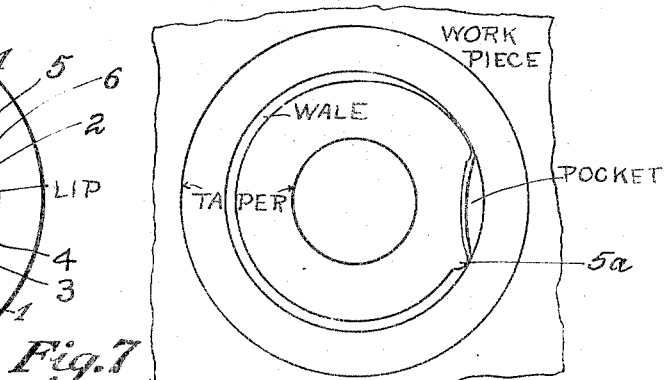
Fig. 7 is a plan view of a work piece after the conical headed machine screw, Fig. 1, has been screwed down tight and then removed to show the then existing imprints in the work piece.

Preferably, a second deflecting ridge 5 is located in the groove I in advance of and adjacent the leading edge 6 of the cutting lip. This ridge 5 also becomes a locking element. It is apparent that the forward or leading edge 6 of the lip not only creates the wale, but also deflects it inwardly, and in co-operation with ridge 5 creates an offset or abutment in the wale just to the rear of the said ridge 5, as at 5a, Fig. 7.

The groove 1, in conjunction with the wale-deflecting ridge 3, or ridges 3 and 5, creates the desired lock-forming elements by guiding a small part of the wale around the lip to form a lock. The greater part of the length of wale is left substantially intact, since it does not have to be ironed out by the conical wall of the head, and no undesirable amount of turning effort need be exerted by the user.

The wale is thus shaped to present an effectual locking pocket that surrounds the leading edge, the back edge, and the trailing edge of the lip, following the travel of the lip while the rotary member is being screwed down upon its seat in the tightening direction.

Figure 1:
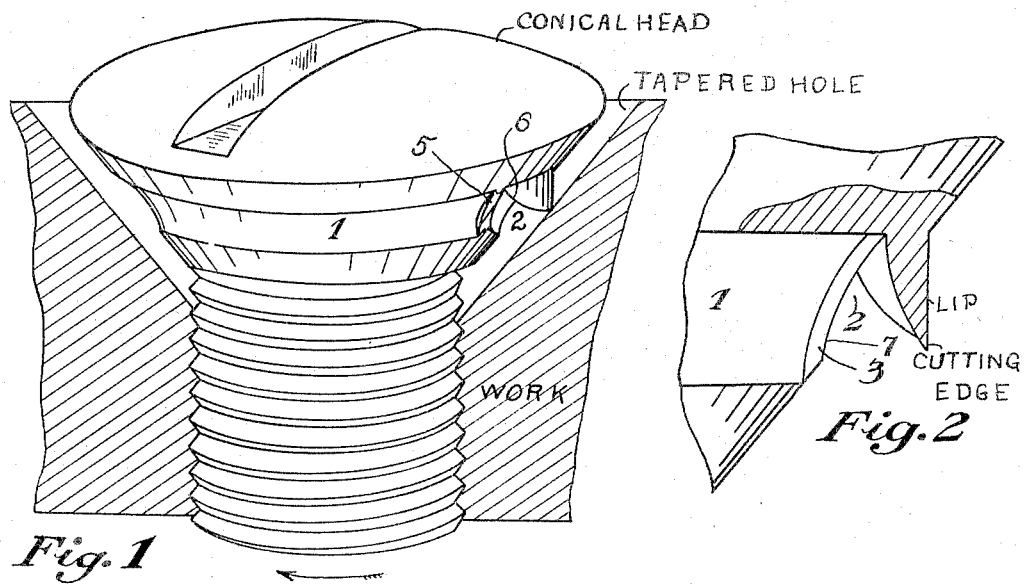
Fig. 1 is a side view in perspective showing a conical headed machine screw of the kind referred to, with my improvement in position to commence forming an A-shaped wale in a work piece. Legends designate features that are common to both disclosures.
Figure 3:
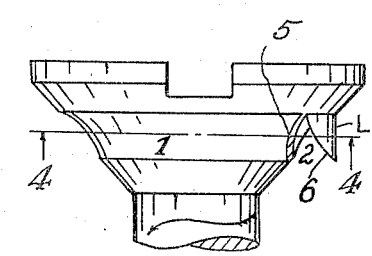
Fig. 3 is a side view of a screw head and lip according to this improvement.
Figure 5:
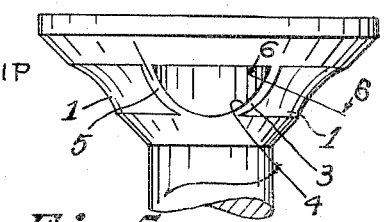
Fig. 5 is a front view of the parts shown in Fig. 3.
Figure 6:
Fig. 6 is a cross-sectional detail of a locking ridge element, the section being taken on line 6—6 of Fig. 5.
Figure 4:
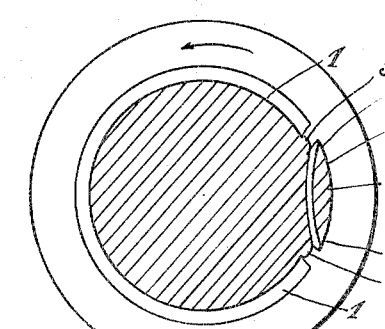
Fig. 4 is a horizontal sectional view of the parts shown in Fig. 3, the section being taken on line 4—4 of Fig. 3.

The height of the deflecting ridge, indicated in Fig. 6, determines to a considerable extent the degree of locking. It can be of a height to force that part of the wale encountered by it flush with the wall of the tapered hole, or it can be only a slight elevation above the bottom of the groove 1 so as to produce a less complete flattening or ironing out of such part of the wale. Such a low ridge allows the screw to be seated more easily than a higher one, but less locking effect is produced. With a higher ridge maximum locking effect can be attained, but more turning force will be required; although not nearly so much as would be required if the groove were not used and substantially the entire length of the wale had to be ironed out.

The outer wale-engaging face 7 of the ridge 3 is preferably narrow enough to sink into any part of the wale that has not been ironed back completely. By thus sinking itself into the protuberant part of the wale, the ridge 3 permits the screw head to come fairly down to its seat in the tapered hole.

The deflecting ridges 3, 5, or either ridge alone, in combination with the peripheral groove 1, will materially reduce the amount of turning effort required to develop adequate locking abutments adjacent the lip, and thereby increases the usefulness and improves the mode of operation of locking devices of this character.

Having thus described my invention, what I claim and desire to secure by Letters Patent is:

1. Self-locking means for securing to a work piece a rotatable threaded member having a conical head with a lip element thereon extending only part way around the periphery of the head, the lower free margin of the lip presenting a cutting edge projecting downwardly from the wall of the head, being spaced therefrom by a pocket-like channel; the head of said rotatable threaded member being formed with a peripheral groove communicating at its ends with the said channel, and a ridge member located in the groove adjacent the lip and projecting outwardly from the bottom of the groove, the outer portion of the ridge being substantially flush with the conical wall of the head.

2. A structure as claimed in claim 1, wherein said ridge member is located adjacent the trailing edge of the lip, and a second ridge member is located in the groove adjacent the advancing edge of the lip when the head is rotated in the tightening direction.

3. In a device of the class described, a conical head, a depending lip thereon having a cutting edge projecting beyond the wall of the conical head and spaced therefrom by a pocket-like channel, the conical wall of the head being provided with a peripheral groove in alinement with said channel and communicating therewith, the effective depth of said groove being less than the depth of the channel and less than the inward projection of a wale formed by said lip in a work piece when said conical head is nearly seated in the work.

4. A structure as claimed in claim 3 wherein a wale-deflecting member is provided adjacent the trailing edge of the lip, when the head is being rotated in the tightening direction, said member projecting outwardly from the bottom of the groove.

5. A structure as claimed in claim 3 wherein a wale-deflecting member is provided adjacent the advancing edge of the lip, when the head is being rotated in the tightening direction, said member projecting outwardly from the bottom of the groove.

6. A rotatable threaded member formed with a conical head having a cutting lip thereon adapted to create an upstanding A-shaped circular wale on the wall of a conical hole in a work-piece, a pocket-like channel behind the lip, the said conical surface of the head being formed with a shallow peripheral groove extending around the head, both of its ends being in communication with said channel, the depth of the groove radially of the head being less than the inward radial projection of the wale when the threaded member is nearly seated in the work piece.

RICHARD T. HOSKING.